US012614277B2

(12) United States Patent　　　(10) Patent No.:　US 12,614,277 B2
Kanai et al.　　　　　　　　　　(45) Date of Patent:　　Apr. 28, 2026

(54) OUTPUT DEVICE, METHOD, NON-TRANSITORY COMPUTER READABLE RECORDING MEDIUM AND DISPLAY DEVICE

(71) Applicant: PANASONIC HOLDINGS CORPORATION, Osaka (JP)

(72) Inventors: Hirofumi Kanai, Osaka (JP); Yuka Yamada, Nara (JP); Toshihide Mori, Osaka (JP); Hideyuki Maehara, Osaka (JP)

(73) Assignee: PANASONIC HOUSING SOLUTIONS CO., LTD., Osaka (JP)

( * ) Notice: Subject to any disclaimer, the term of this patent is extended or adjusted under 35 U.S.C. 154(b) by 475 days.

(21) Appl. No.: 18/085,007

(22) Filed: Dec. 20, 2022

(65) Prior Publication Data

US 2023/0122501 A1　　Apr. 20, 2023

Related U.S. Application Data

(63) Continuation of application No. PCT/JP2021/017724, filed on May 10, 2021.

(Continued)

(51) Int. Cl.
　　*G06T 7/00*　　　　(2017.01)
　　*E03D 9/00*　　　　(2006.01)
　　　　　　(Continued)

(52) U.S. Cl.
　　CPC .............. *G06T 7/0012* (2013.01); *E03D 9/00* (2013.01); *G06T 7/11* (2017.01); *G06T 7/90* (2017.01);
　　　　　　(Continued)

(58) Field of Classification Search
　　CPC ......... G06T 7/0012; G06T 7/11; G06T 7/187; G06T 7/90; G06T 2207/10024;
　　　　　　(Continued)

(56) References Cited

U.S. PATENT DOCUMENTS

2014/0311415 A1 * 10/2014 Tanigawa ............. A01K 29/005
　　　　　　　　　　　　　　　　119/163
2014/0323836 A1 * 10/2014 Kusukame ............... A61B 5/00
　　　　　　　　　　　　　　　　600/300

(Continued)

FOREIGN PATENT DOCUMENTS

CN　　　　106651883 A　　5/2017
CN　　　　108010102 A　　5/2018
　　　　　　(Continued)

OTHER PUBLICATIONS

International Search Report (ISR) from International Searching Authority (Japan Patent Office) in International Pat. Appl. No. PCT/JP2021/017724, dated Jul. 27, 2021, together with an English language translation.

(Continued)

*Primary Examiner* — Oneal R Mistry
*Assistant Examiner* — Duy Tran
(74) *Attorney, Agent, or Firm* — GREENBLUM & BERNSTEIN, P.L.C.

(57)　　　　　　ABSTRACT

An output device includes: an acquisition part that acquires a first image covering excrement captured by a camera to photograph an inside of a bowl of a toilet; a dividing part that divides the acquired first image into a plurality of divisional areas; a calculation part that calculates an area representative value including a representative value of each of the color components of each of the divisional areas; and an output part that outputs the calculated area representative value.

13 Claims, 14 Drawing Sheets

Related U.S. Application Data

(60) Provisional application No. 63/044,723, filed on Jun. 26, 2020.

(51) Int. Cl.

| | | |
|---|---|---|
| *G06T 7/11* | (2017.01) | |
| *G06T 7/90* | (2017.01) | |
| *G06V 10/44* | (2022.01) | |
| *H04N 7/18* | (2006.01) | |

(52) U.S. Cl.
CPC ............. *G06V 10/44* (2022.01); *H04N 7/183* (2013.01); *G06T 2207/10024* (2013.01); *G06T 2207/20021* (2013.01); *G06T 2207/30004* (2013.01)

(58) Field of Classification Search
CPC .......... G06T 2207/20021; G06T 2207/30004; G06V 10/44; G06V 10/22; G06V 10/25; G06V 10/255; G06V 20/52; G06V 10/46; G06V 10/56; G06V 2201/03; G06V 10/36; G06V 30/18133; E03D 9/00; E03D 11/00; H04N 7/183; H04N 7/188; H04N 1/32229; H04N 1/6038; H04N 2209/046

See application file for complete search history.

(56) References Cited

U.S. PATENT DOCUMENTS

| | | | | |
|---|---|---|---|---|
| 2017/0198329 | A1 | 7/2017 | Ayyub et al. | |
| 2017/0303901 | A1* | 10/2017 | Sekine ................. | G01N 21/314 |
| 2018/0085098 | A1* | 3/2018 | Attar ......................... | G01J 3/10 |
| 2018/0368818 | A1* | 12/2018 | Oguri ...................... | E03D 11/13 |
| 2019/0212322 | A1* | 7/2019 | Tsuruoka ............. | A61B 5/6887 |
| 2019/0285612 | A1* | 9/2019 | Sun ......................... | G16H 30/40 |

FOREIGN PATENT DOCUMENTS

| | | | | | |
|---|---|---|---|---|---|
| CN | 111305338 | | 6/2020 | | |
| JP | 2007-72964 | | 3/2007 | | |
| JP | 2007-252805 | | 10/2007 | | |
| JP | 2017-513487 | | 6/2017 | | |
| JP | 2018054443 | A * | 4/2018 | | |
| JP | 2018-136292 | | 8/2018 | | |
| KR | 20060004150 | A * | 1/2006 | ....... | G01N 33/48785 |
| KR | 10-1876151 | | 8/2018 | | |
| KR | 10-2019-0030822 | | 3/2019 | | |

OTHER PUBLICATIONS

Apr. 15, 2025 Japanese Office Action in Japanese Application No. 2022-532383 and English translation thereof.

* cited by examiner

FIG.10

| H1 | R | 36 |
|----|---|-----|
|    | G | 49 |
|    | B | 42 |

1

OUTPUT DEVICE, METHOD, NON-TRANSITORY COMPUTER READABLE RECORDING MEDIUM AND DISPLAY DEVICE

TECHNICAL FIELD

This disclosure relates to a technology of outputting information about excrement.

BACKGROUND ART

Patent Literature 1 discloses a technology of measuring a shape and a color of faces or stool, classifying the measured shape into a plurality of states as a first factor of the stool, classifying the measured color into a plurality of color tones as a second factor of the stool, and specifying a disease and a health condition each associated with the state of the stool in accordance with a combination of the first factor and the second factor.

However, Patent Literature 1 aims at specifying a disease and a health condition, and fails to specify information about a state of the stool itself, and thus needs further improvement.

CITATION LIST

Patent Literature

Patent Literature 1: Japanese Unexamined Patent Publication No. 2018-136292

SUMMARY OF INVENTION

This disclosure has been achieved to solve the drawback described above, and has an object of providing a technology of outputting information available for specifying a state of excrement while protecting privacy of an excreter and suppressing a psychological stress of a manager who manages the excreter.

An output device according to an aspect of the disclosure is an output device for outputting information about excrement. The output device includes: an acquisition part that acquires a first image covering the excrement captured by a camera to photograph an inside of a bowl of a toilet, the first image containing one or more color components; a dividing part that divides the acquired first image into a plurality of divisional areas; a calculation part that calculates an area representative value including a representative value of each of the color components of each of the divisional areas; and an output part that outputs the calculated area representative value.

2

Figure 5:
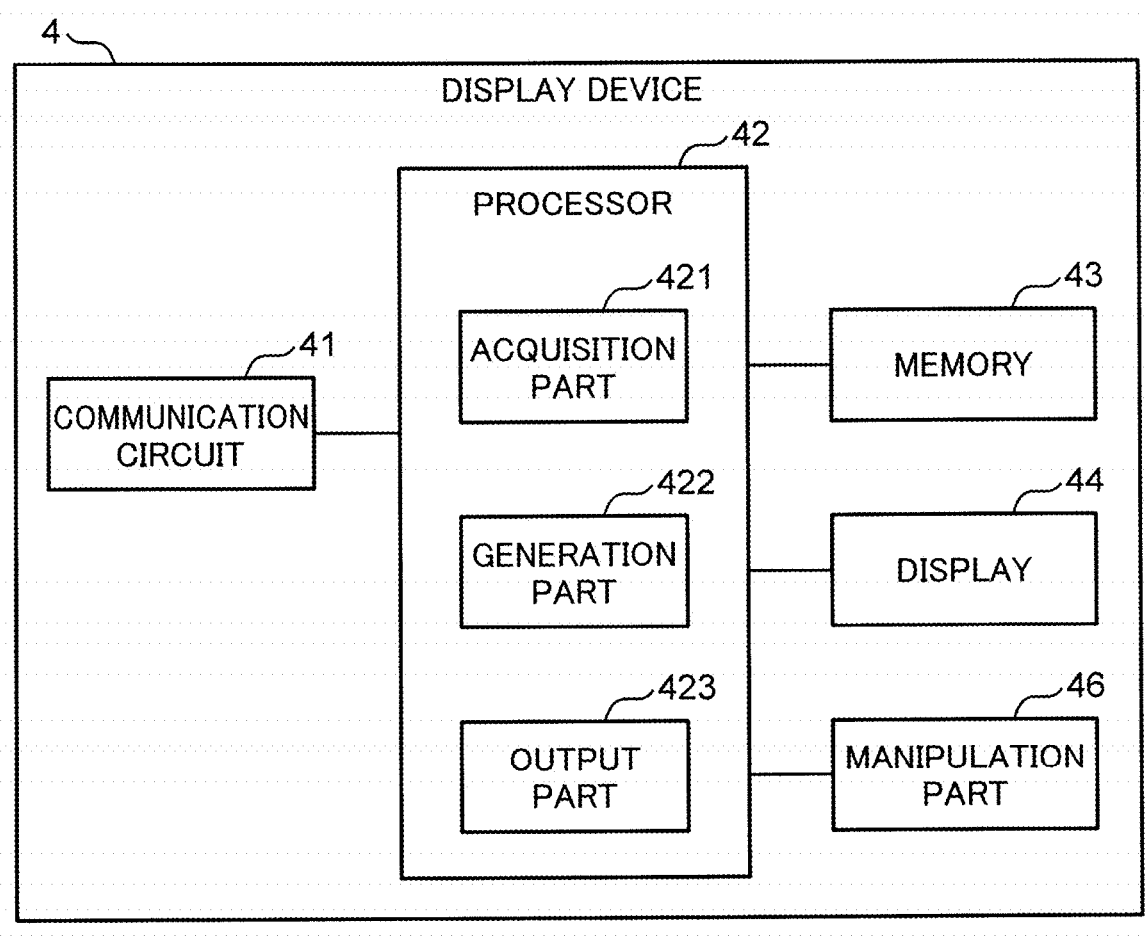

FIG. 5 is a block diagram showing an example of a configuration of a display device.

Figure 6:
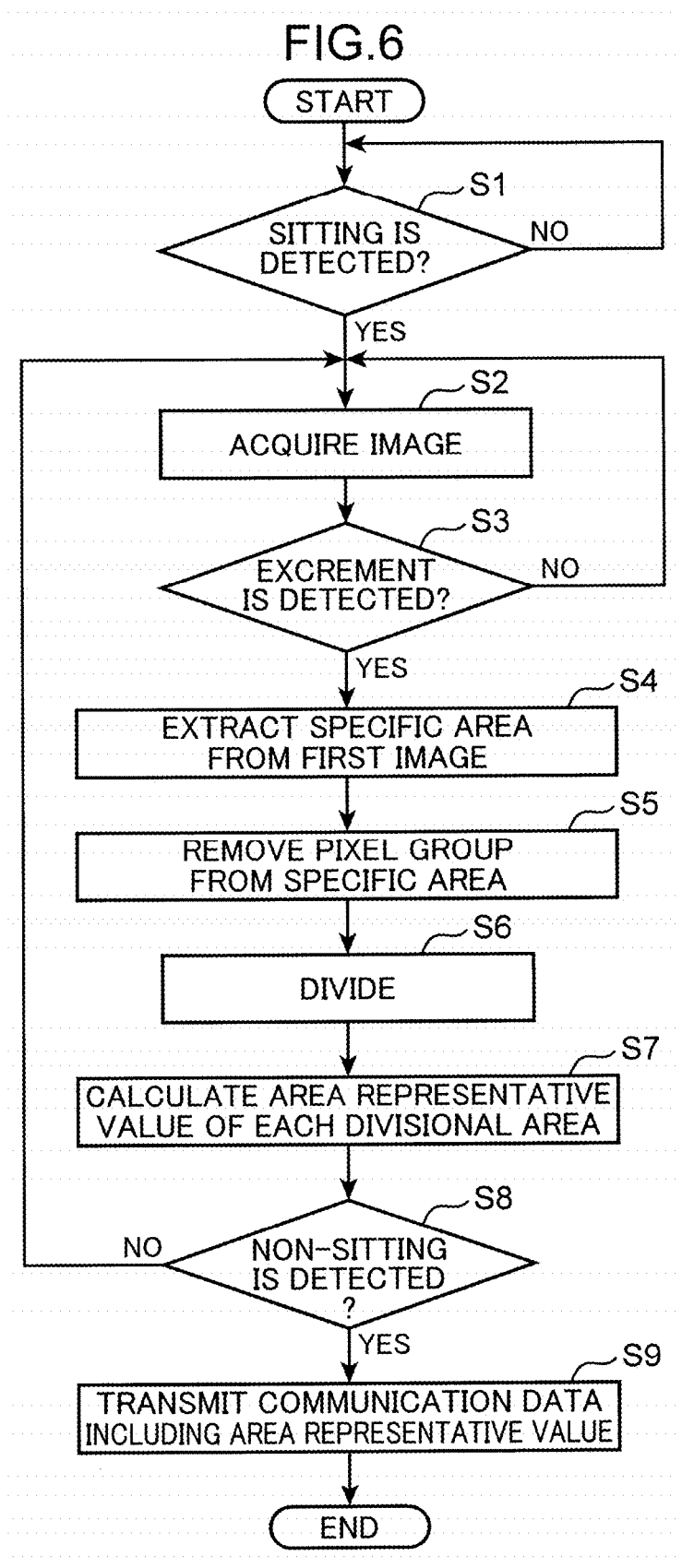

FIG. 6 is a flowchart showing an example of a process by the output device in the first embodiment of the disclosure.

Figure 7:
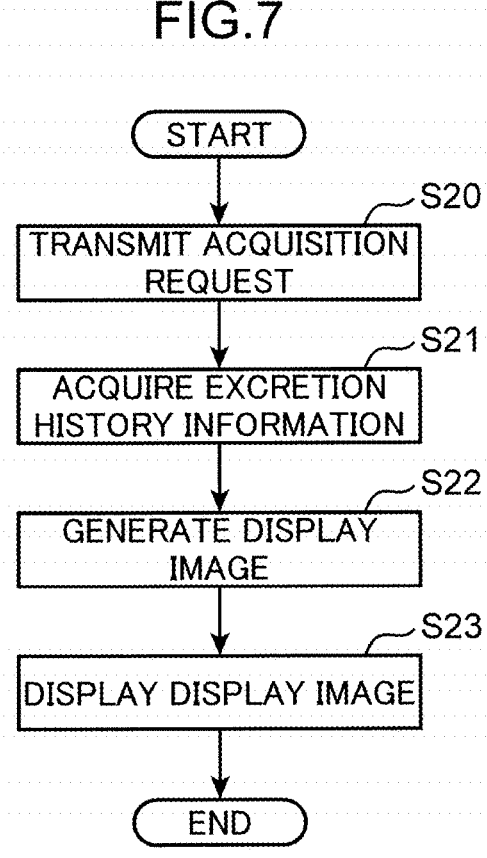

FIG. 7 shows an example of a process by the display device for displaying a display image.

Figure 8:
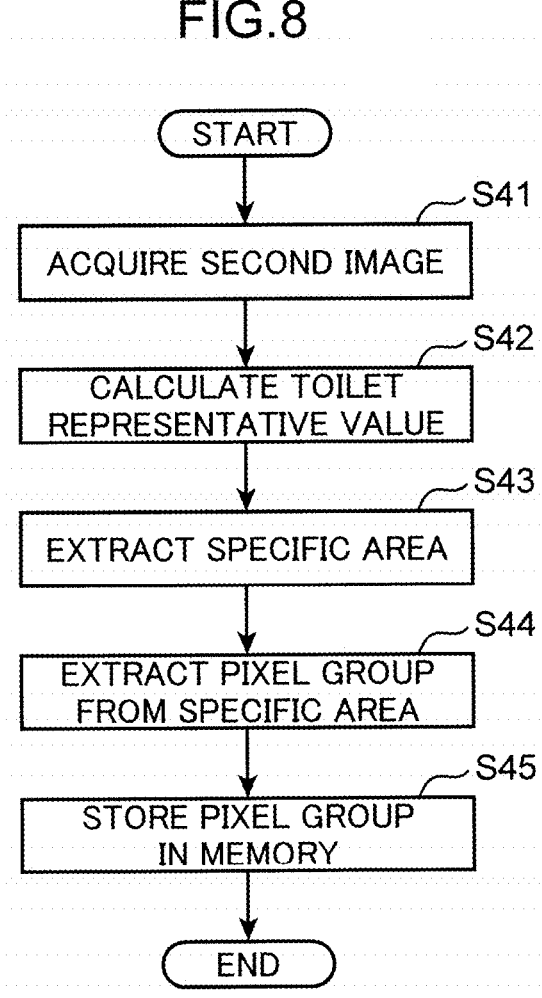

FIG. 8 is a flowchart showing an example of a calibration process in the output device.

Figure 9:
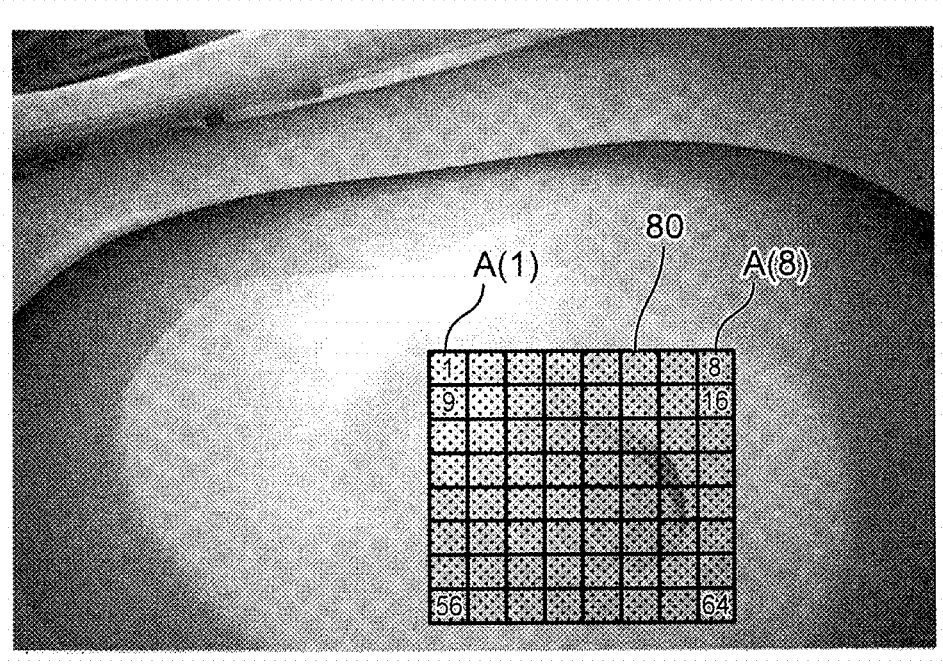

FIG. 9 shows an example of a specific area divided into a plurality of divisional areas.

FIG. 10 is an explanatory view of the calibration process.

Figure 11:
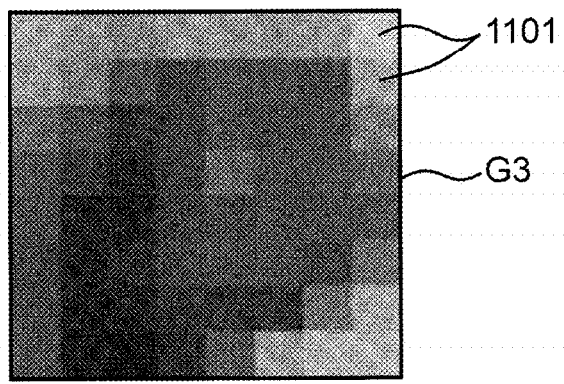

FIG. 11 shows an example of a display image.

Figure 12:
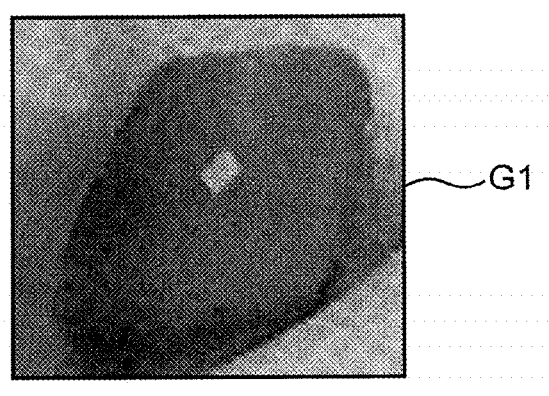

FIG. 12 shows an example of an image of a specific area extracted from a first image.

Figure 13:
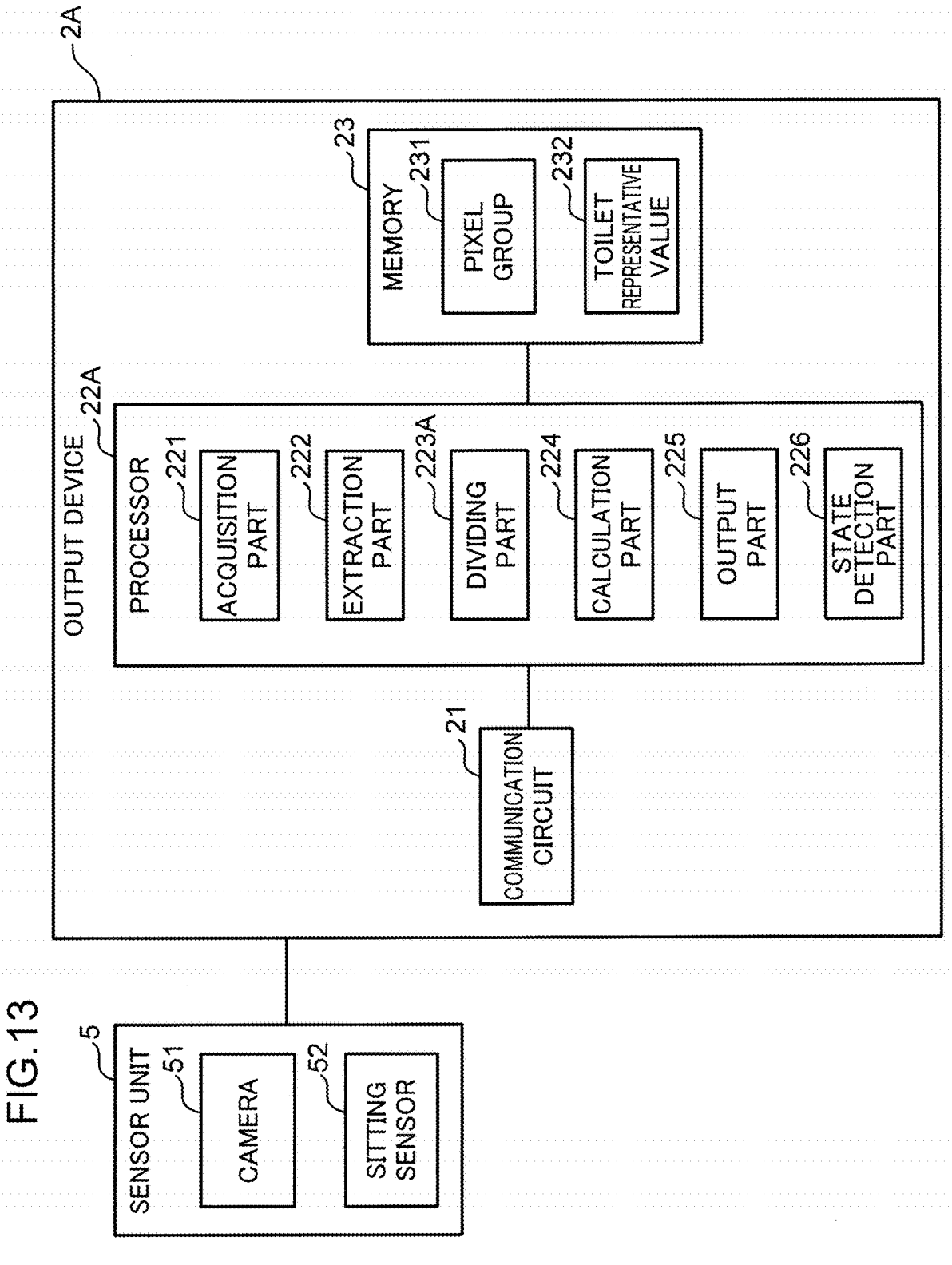

FIG. 13 is a block diagram showing an example of a configuration of an output device according to a second embodiment of the disclosure.

Figure 14:
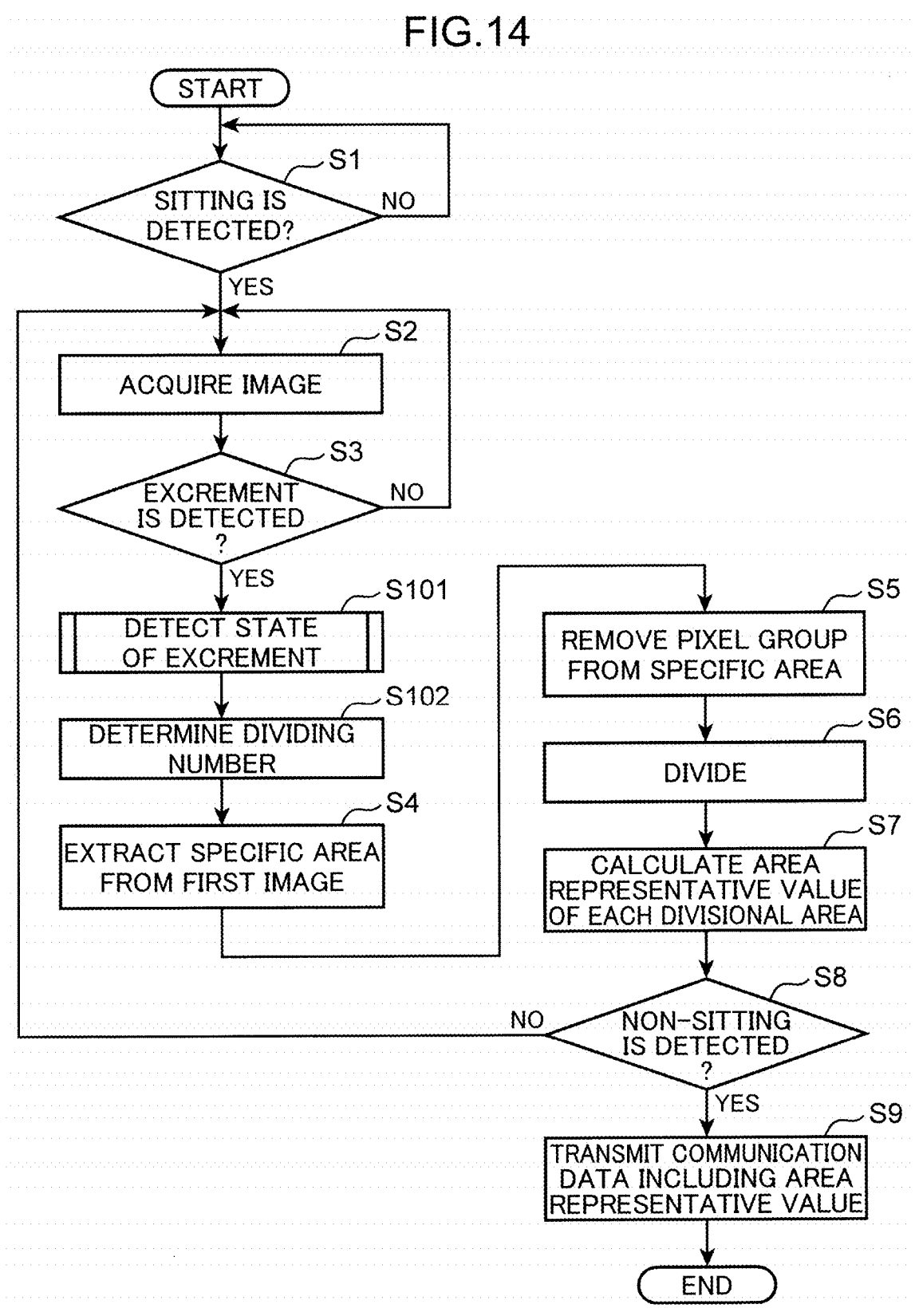

FIG. 14 is a flowchart showing an example of a process by the output device according to the second embodiment of the disclosure.

Figure 15:
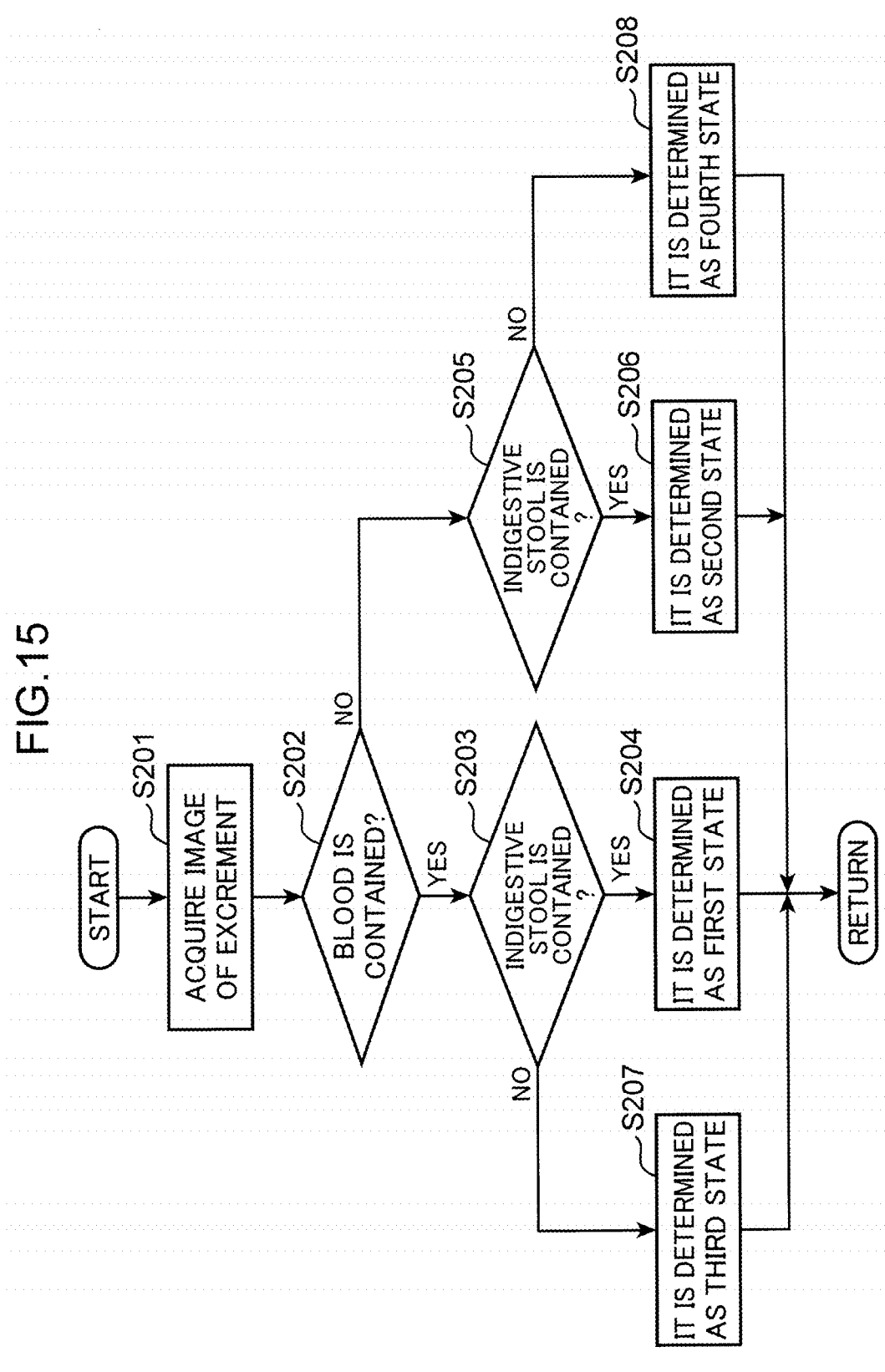

FIG. 15 is a flowchart showing details of step S101 in FIG. 14.

DESCRIPTION OF EMBODIMENTS

Knowledge Forming the Basis of the Present Disclosure

In elderly care facilities and hospitals, management of a state of excrement of a user who uses such a facility is important for health maintenance of the user. However, recordation of an image of excrement as it is for the management of the state of the excrement leads to a failure in protection of privacy of the user. Moreover, a facility manager who manages the health condition of the user and is required to visually confirm an image of the excrement as it is may have a psychological stress.

Meanwhile, the manager needs to grasp information available for specifying the state of the excrement, such as a color, an amount, and a shape of the excrement itself, a content of the excrement like diarrhea, and an amount and a distribution of blood contained in the excrement to fully understand the health condition of the user. However, it has been found that presentation of an image roughly showing excrement before the manager is satisfactory to allow the manager to grasp the information described above without the necessity of presenting an image showing the excrement in detail before the manager.

Patent Literature 1 fails to present an image of excrement. Therefore, the manager cannot grasp information about a color, an amount, and a shape of the excrement, a content of the excrement like diarrhea, and an amount and a distribution of blood contained in the excrement. The manager thus cannot satisfactorily and accurately understand the health condition of the excreter.

This disclosure has been achieved to solve the drawback described above, and has an object of providing a technology of outputting information available for specifying a state of excrement while protecting privacy of an excreter and suppressing a psychological stress of a manager who manages the excreter.

An output device according to an aspect of the disclosure is an output device for outputting information about excrement. The output device includes: an acquisition part that acquires a first image covering the excrement captured by a camera to photograph an inside of a bowl of a toilet, the first image containing one or more color components; a dividing part that divides the acquired first image into a plurality of divisional areas; a calculation part that calculates an area representative value including a representative value of each of the color components of each of the divisional areas; and an output part that outputs the calculated area representative value.

According to this configuration, the first image covering the excrement is captured, the first image is divided into a plurality of divisional areas, an area representative value including a representative value of each of the color components of each of the divisional areas is calculated, and the area representative value is output. In this respect, the area representative value including the representative value of each of the color components of each of the divisional areas is output in place of an image showing excrement as it is. Therefore, the image roughly showing the excrement is presentable. Further, this configuration enables output of information available for specifying information about the state of the excrement itself while protecting the privacy of an excreter and suppressing a psychological stress of the manager of the excreter.

In the output device, the acquisition part may further acquire a second image not covering the excrement captured by the camera. The output device may further include an extraction part that extracts, from the acquired second image, a pixel group including pixels constituting a drain hole of the toilet. The dividing part may remove the pixel group from the first image, and divide the first image subjected to the removal into a plurality of divisional areas.

According to this configuration, the pixel group including pixels constituting the drain hole of the toilet is removed, and the first image subjected to the removal of the pixel group is divided into the plurality of divisional areas. Therefore, the area representative value is calculatable after removing the information about the drain hole. Consequently, the area representative value more accurately representing the state of the excrement is calculatable.

In the output device, the pixel group may include pixels constituting a stain adhered to the toilet.

According to this configuration, the pixel group removed from the first image includes pixels constituting the stain adhered to the toilet, and therefore, the area representative value is calculatable after the removal of the information about the stain adhered to the toilet. Consequently, the area representative value more accurately representing the state of the excrement is calculatable.

In the output device, the extraction part may calculate, for the second image, a toilet representative value including a representative value of each of the color components in a region corresponding to a predetermined portion of the bowl except for the drain hole, and extract, as a pixel in the image pixel group, a pixel having a pixel value out of a predetermined range including the toilet representative value.

According to this configuration, for the second image not covering the excrement, a pixel having a pixel value out of the predetermined range including the toilet representative value is extracted as a pixel in the image pixel group, and therefore, the pixels constituting the stain adhered to the toilet and the pixels constituting the drain hole are extractable as those in the image pixel group to be removed from the first image.

In the output device, the extraction part may execute the pixel group extraction at a time when the output device is arranged or at a fixed interval.

According to this configuration, the pixel group is extractable at the time when the output device is arranged. Under the circumstances, a pixel group accurately showing a drain hole of each toilet and a stain adhered thereto is calculatable in consideration of an arrangement environment of the toilet.

Alternatively, the pixel group extraction at a fixed interval results in achievement of extraction of a pixel group constituting a stain adhered to the toilet and being changed time to time.

The output device may further include a state detection part that detects a state of the excrement from the first image. The dividing part may determine, based on the detected state, a dividing number into the divisional areas.

This configuration determines, based on the state of the excrement, the dividing number into the divisional areas. Hence, for instance, it is possible to increase the dividing number into the divisional areas for excrement having a high possibility of a disease. In this manner, the manager can observe the excrement in more detail and thus can detect a possible disease of the excreter at an early stage.

In the output device, the dividing part may increase the dividing number when the excrement is at least in a state of containing blood or a state of containing undigested stool.

According to this configuration, the dividing number is increased when the excrement is at least in the state of containing blood or the state of containing undigested stool. In such a case, a manager can observe the excrement in more detail and thus can detect a possible disease of the excreter at an early stage.

In the output device, the calculation part may calculate, when a divisional area containing a contour of the excrement is detected among the divisional areas, the area representative value of the detected divisional area by using only pixels constituting the excrement.

In a case where a first image is divided into a plurality of divisional areas, a divisional area containing a contour of excrement includes pixels constituting the excrement and pixels constituting the toilet. When an area representative value is calculated by using all the pixels of the divisional area, the area representative value results in including information about the toilet, and thus fails to accurately represent the information about the excrement.

According to this configuration, an area representative value of the divisional area containing a contour of excrement is calculated by using only the pixels constituting the excrement. Therefore, the area representative value can accurately represent the information about the excrement.

In the output device, the dividing part may divide a predetermined specific area of the first image including the drain hole of the toilet into a plurality of divisional areas.

According to this configuration, the specific area of the first image including the drain hole is divided into a plurality of divisional areas. Therefore, the area representative value is calculatable only for a focused region having a high possibility of existence of the excrement. This results in attaining process optimization.

In the output device, the output part may output the area representative value to the server connected via a network.

This configuration permits the server to manage the area representative value. Besides, a data amount for the area representative value is much smaller than that for the first image, and therefore, the area representative value is rapidly transmittable to the server and further a consumptive amount of the memory source of the server therefor is reducible.

In the output device, the one or more color components may include red, green, and blue components.

This configuration enables calculation of the area representative value including a representative value of each of the color components of red, green, and blue.

In the output device, the area representative value may take an average value of pixel values for each of the color components in each of the divisional areas.

This configuration enables calculation of the area representative value taking the average value of pixel values for each of the color components and satisfactorily representing the feature of each of the color components.

A method according to another aspect of the disclosure is a method for an output device that outputs information about excrement. The method includes, by a processor included in the output device: acquiring a first image covering the excrement captured by a camera to photograph an inside of a bowl of a toilet, the first image containing one or more color components; dividing the acquired first image into a plurality of divisional areas; calculating an area representative value including a representative value of each of the color components of each of the divisional areas; and outputting the calculated area representative value.

According to this configuration, it is possible to provide a method that exerts the same operational effects as those of the output device.

A program according to further another aspect of the disclosure is a program causing a computer to serve as an output device that outputs information about excrement. The program includes: causing a processor included in the output device to execute: acquiring a first image covering the excrement captured by a camera to photograph an inside of a bowl of a toilet, the first image containing one or more color components; dividing the acquired first image into a plurality of divisional areas; calculating an area representative value including a representative value of each of the color components of each of the divisional areas; and outputting the calculated area representative value.

According to this configuration, it is possible to provide a program that exerts the same operational effects as those of the output device described above.

A display device according to still another aspect of the disclosure is a display device for displaying information about excrement. The display device includes: an acquisition part that acquires an area representative value by dividing an image covering the excrement and containing one or more color components into a plurality of divisional areas, the area representative value including a representative value of each of the color components of each of the divisional areas; a generation part that generates a display image showing each of the divisional areas at the area representative value corresponding to the divisional area; and an output part that displays the generated display image on a display.

According to this configuration, the display image showing each of the divisional areas at the area representative value corresponding to the divisional area is displayed on the display. This enables the displaying of the display image showing information available for specifying the state of the excrement itself while protecting the privacy of the excreter and suppressing a psychological stress of the manager of the excreter.

A method according to still further another aspect of the disclosure is a method for a display device that displays information about excrement. The method includes, by a processor included in the display device: acquiring an area representative value by dividing an image covering the excrement and containing one or more color components into a plurality of divisional areas, the area representative value including a representative value of each of the color components of each of the divisional areas; generating a display image showing each of the divisional areas at the area representative value corresponding to the divisional area; and displaying the generated display image on a display.

According to this configuration, it is possible to provide a method that exerts the same operational effects as those of the display device.

A program according to still further another aspect of the disclosure is a program causing a computer to serve as a display device that outputs information about excrement. The program includes: causing a processor included in the display device to execute: acquiring an area representative value by dividing an image covering the excrement and containing one or more color components into a plurality of divisional areas, the area representative value including a representative value of each of the color components of each of the divisional areas; generating a display image showing each of the divisional areas at the area representative value corresponding to the divisional area; and displaying the generated display image on a display.

According to this configuration, it is possible to provide a program that exerts the same operational effects as those of the display device described above.

Additionally, according to this closure, it goes without saying that the computer program is distributable as a non-transitory computer readable storage medium like a CD-ROM, or distributable via a communication network like the Internet.

Each of the embodiments which will be described below represents a specific example of the disclosure. Numeric values, shapes, constituent elements, steps, and the order of the steps described below are mere examples, and thus should not be construed to delimit the disclosure. Moreover, constituent elements which are not recited in the independent claims each showing the broadest concept among the constituent elements in the embodiments are described as selectable constituent elements. The respective contents are combinable with each other in all the embodiments.

First Embodiment

Figure 1:
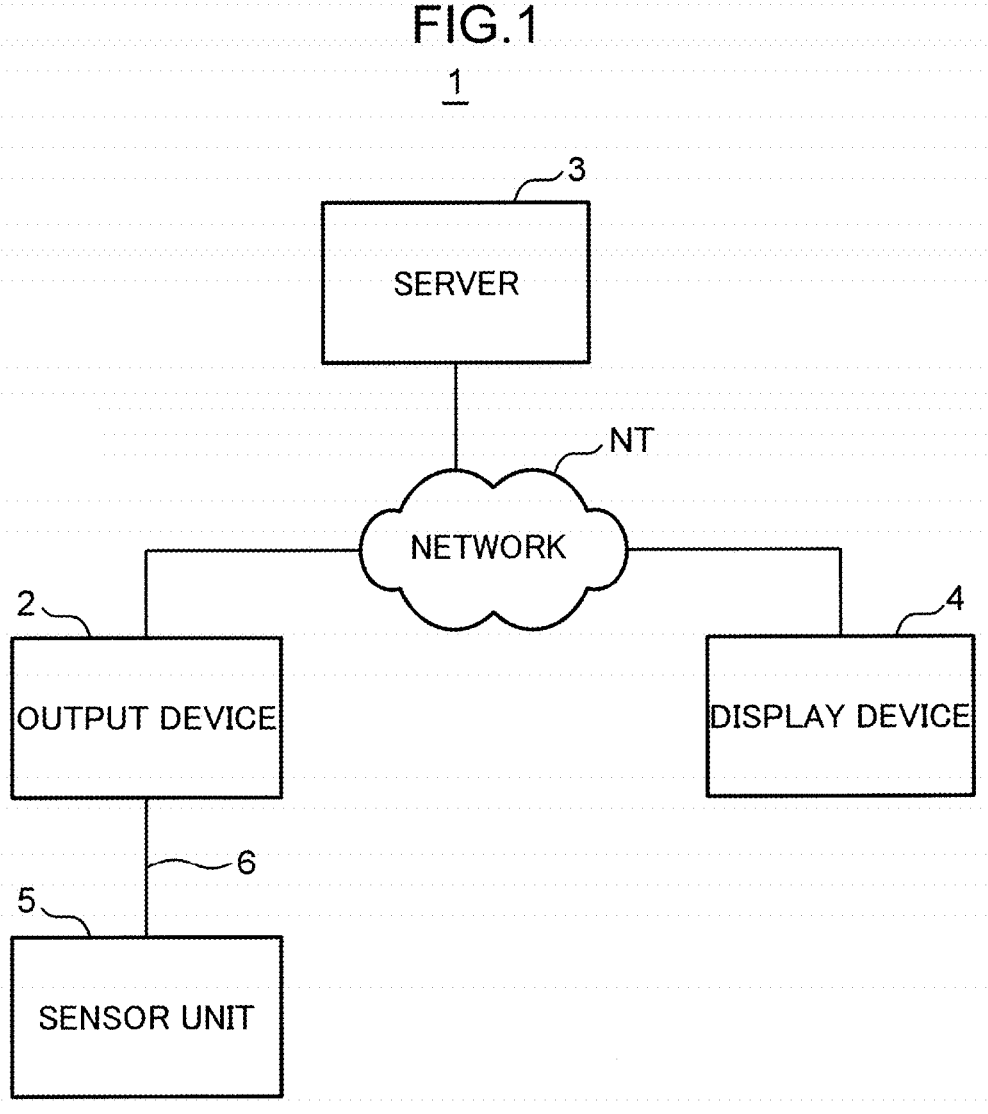
FIG. 1 is a block diagram showing an example of an overall configuration of an excrement management system in a first embodiment of this disclosure.

FIG. 1 is a block diagram showing an example of an overall configuration of an excrement management system 1 in a first embodiment of this disclosure. The excrement management system 1 is introduced into a facility, such as an elderly care facility and a hospital, for managing a state of excrement of a user who uses the facility. Examples of the user include a care receiver who receives care in an elderly care facility and a patient who is medically treated in a hospital.

The excrement management system 1 includes an output device 2, a server 3, a display device 4, and a sensor unit 5. The output device 2, the server, 3, and the display device 4 are communicably connected to one another via a network NT. The network NT includes, for example, a wide area network having an internet communication network and a mobile phone communication network. The output device 2 and the sensor unit 5 are arranged at a toilet and communicably connected to each other via a communication channel 6. Examples of the communication channel 6 include the Bluetooth (registered trademark), an infrared communication, and a near field communication, such as the NFC. The communication channel 6 may be a wired communication channel.

The output device 2 acquires sensing data acquired by the sensor unit 5 via the communication channel 6. The output device 2 analyzes the sensing data, calculates an area representative value to be described later, and transmits communication data containing the calculated area representative value to the server 3. The server 3 generates excretion history information including the area representative value contained in the communication data and stores the generated excretion history information in an excretion history database to be described later. The display device 4 acquires, if necessary, the excretion history information from the server 3 via the network NT, generates a display image to be described later from the area representative value included in the excretion history information, and displays the generated display image on a display thereof. The sensing data contains an image to be described later and sitting data.

The server 3 includes, for example, a cloud server including one or more computers. The display device 4 includes, for example, a computer owned by the manager. The display device 4 may include, for example, a stationary computer, a smartphone, or a tablet computer. Examples of the manager include a caregiver or carer, a care manager of a care receiver, and a doctor in charge of medical treatment of a patient.

Figure 2:
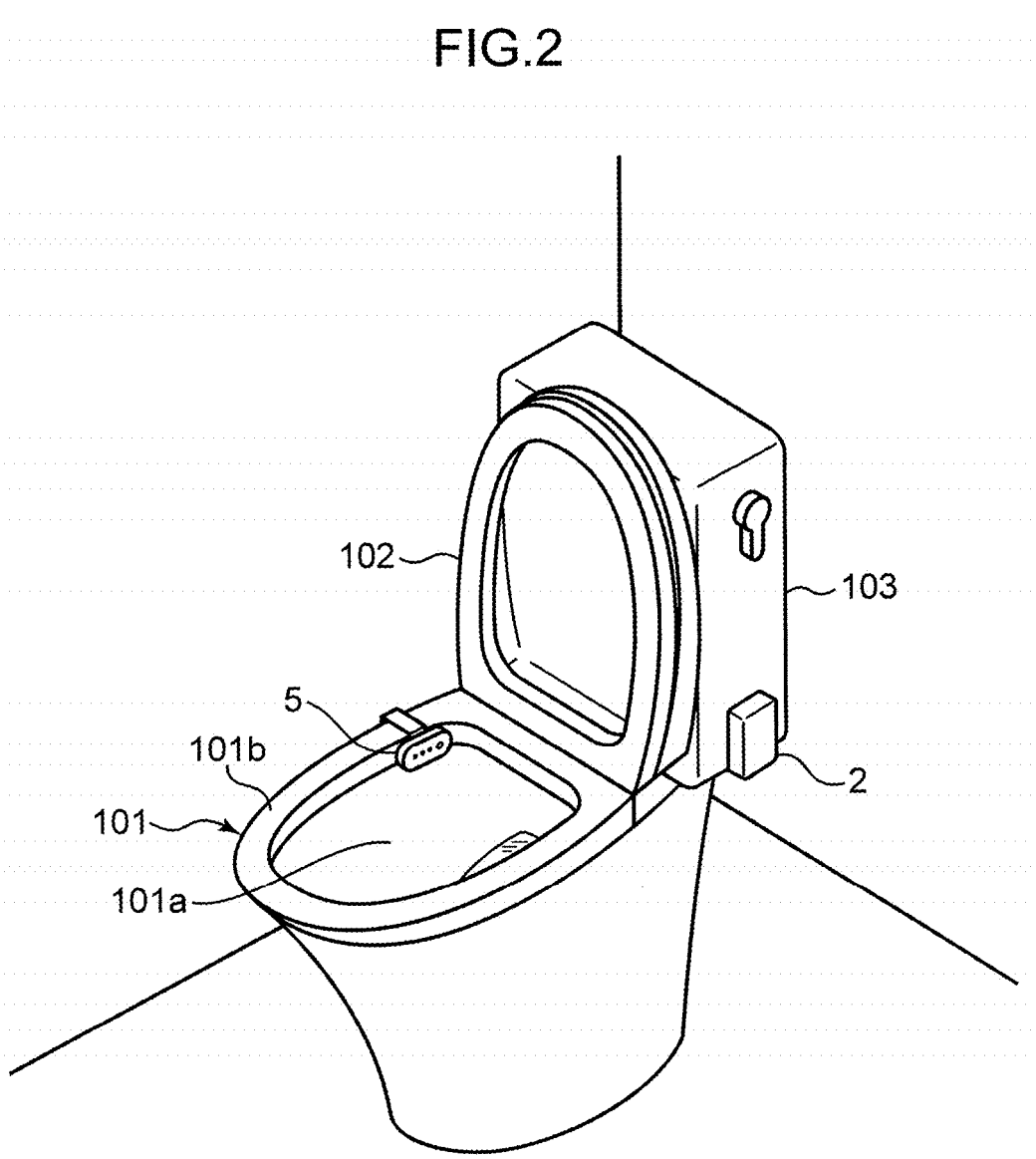
FIG. 2 is a view explaining arrangement positions of a sensor unit and an output device in the first embodiment of the disclosure.

FIG. 2 is a view explaining arrangement positions of the sensor unit 5 and the output device 2 in the first embodiment of the disclosure. As shown in FIG. 2, a toilet 101 includes a bowl 101*a* and a fringe part 101*b*. The fringe part 101*b* is located at an upper end of the toilet 101 and defines an opening section of the toilet 101. The bowl 101*a* is located below the fringe part 101*b* to receive stool and urine. The sensor unit 5 is attached on the fringe part 101*b*.

The bowl 101*a* has a bottom provided with an unillustrated drain hole. Excrement excreted in the bowl 101*a* is caused to flow to a sewage pipe through the drain hole. In other words, the toilet 101 is in the form of a toilet of a flush type. Moreover, a toilet seat 102 is provided on a top of the toilet 101 to allow a user to sit thereon. The toilet seat 102 is rotatable upward and downward. The user sits on the toilet seat 102 lowered to lie on the toilet 101. A water reservoir tank 103 that stores flush water to cause the excrement to flow to the sewage is provided in the rear of the toilet 101.

Figure 3:
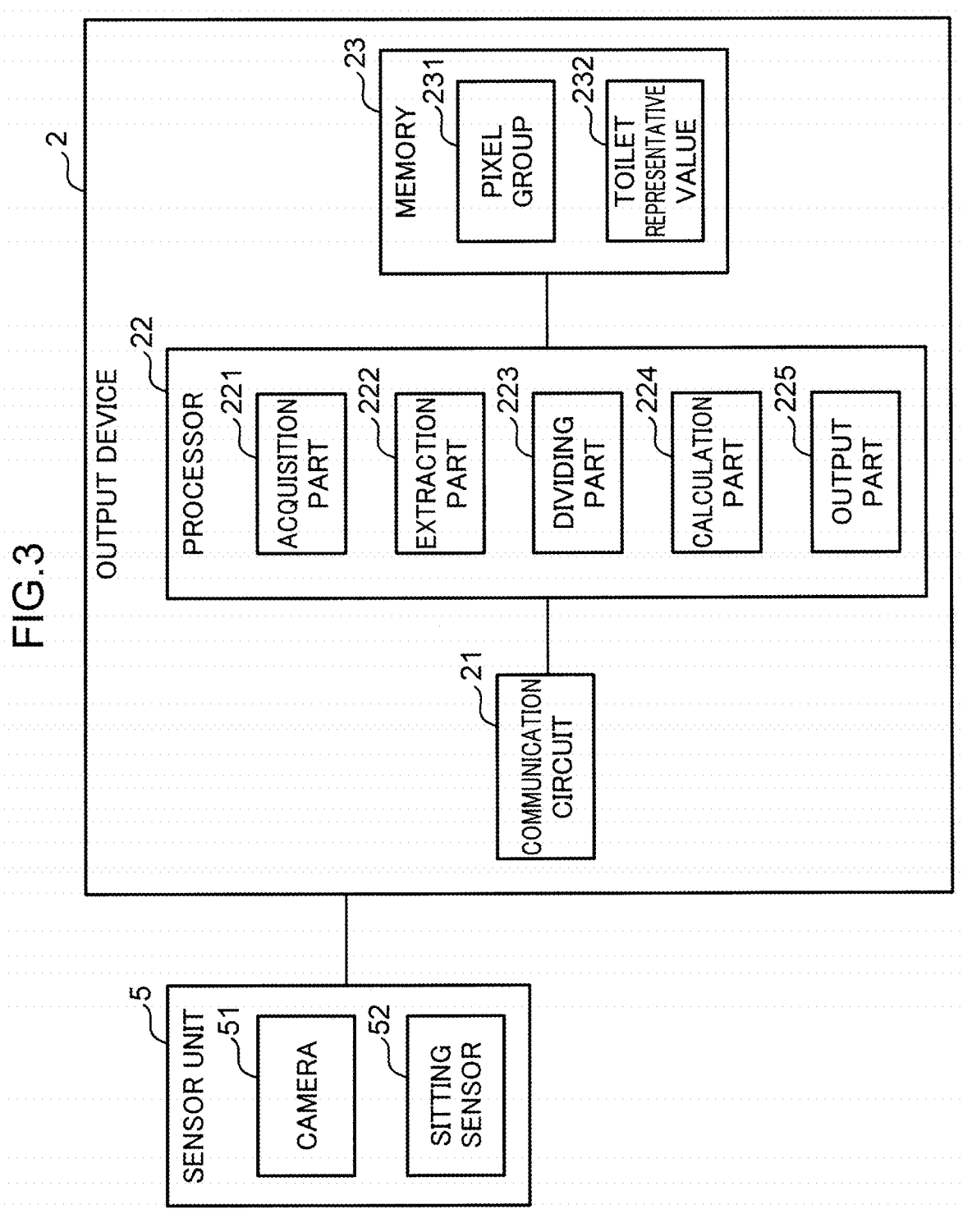
FIG. 3 is a block diagram showing an example of a configuration of the output device and the sensor unit shown in FIG. 1.

FIG. 3 is a block diagram showing an example of a configuration of the output device 2 and the sensor unit 5 shown in FIG. 1. The sensor unit 5 has a camera 51 and a sitting sensor 52. The camera 51 is located at the toilet 101 to capture an image of the bowl 101*a*. For instance, the camera 51 has a high sensitivity and a wide angle, and is configured to capture a color image having three color components of an R (red) component, a G (green) component, and a B (blue) component. However, this is a mere example, and the camera 51 may be a black-and-white or monochrome camera. A camera for capturing an image of an object by irradiating the object with an infrared light emitting diode and a white light emitting diode is universally used in a field of detecting objects. However, such a conventional camera faces difficulty in detecting, in particular, an object having many red-based color components. Therefore, it is difficult to distinguish stool and urine from each other. From this perspective, a camera having a high sensitivity and a wide angle is adopted as the camera 51 in the embodiment. Specifically, the camera 51 includes a CMOS having a size of one fourth inch with a high sensitivity. The camera 51 is in the form of a wide-angle camera having a horizontal view angle of 120 degrees and a vertical view angle of 100 degrees. The numerical value of each of the inches and the view angles shows a mere example, and another numerical value is adoptable. The camera 51 photographs an inside of the bowl 101*a* at a predetermined frame rate, and transmits an obtained image to the output device 2.

The sitting sensor 52 detects whether the user sits on the toilet seat 102. The sitting sensor 52 includes, for example, an illuminance sensor which detects an illuminance of a periphery of a bowl 101*a*, and a distance measurement sensor which detects a distance to a certain object at the periphery of the bowl 101*a*. When the user sits on a toilet seat 102, the opening section is closed by the buttocks of the user, and therefore, the periphery of the bowl 101*a* gets dark, and thus it is determined that an object exists in the vicinity of a sensor unit 105. In this way, use of the illuminance sensor and the distance measurement sensor leads to achievement of detecting whether the user sits on the toilet seat 102. The sitting sensor 52 may include a pressure sensor which detects a pressure of the user on the toilet seat 102, in place of the illuminance sensor and the distance measurement sensor. When the sitting sensor 52 includes the pressure sensor, the sitting sensor 52 is disposed at the toilet seat 102. Alternatively, the sitting sensor 52 may include either the illuminance sensor or the distance measurement sensor. The sitting sensor 52 detects sitting or not sitting of the user at a predetermined sampling rate, and always outputs sitting data indicating a detection result to the output device 2.

The output device 2 includes a communication circuit 21, a processor 22, and a memory 23. The communication circuit 21 connects the output device 2 to the network NT and the communication channel 6. The communication circuit 21 receives an image transmitted from the camera 51 at a predetermined frame rate. The predetermined frame rate has a certain value falling within a range of, for example, 1 to 120 fps. The communication circuit 21 receives the sitting data transmitted from the sitting sensor 52 at a predetermined frame rate. The communication circuit 21 transmits communication data to the server 3.

For instance, the processor 22 has a central processing unit, and has an acquisition part 221, an extraction part 222, a dividing part 223, a calculation part 224, and an output part 225. Each of the acquisition part 221 to the output part 225 may be realized when the processor 22 executes a predetermined program, or may be established in the form of a dedicated hardware circuit.

The acquisition part 221 acquires a first image being an image covering excrement photographed by the camera 51 by using the communication circuit 21. The acquisition part 221 further acquires a second image being an image not covering the excrement photographed by the camera 51 by using the communication circuit 21. The acquisition part 221 acquires the sitting data by using the communication circuit 21.

The extraction part 222 extracts a pixel group including pixels constituting a drain hole of the toilet 101 and pixels constituting a stain adhered to the toilet from the second image, and stores the extracted pixel group in the memory 23. The pixel group stored in the memory 23 is referred to as a pixel group 231. The pixel group 231 is calculated in advance through calibration described below.

The calibration will be described in detail below. First, the extraction part 222 calculates, for the second image, a toilet representative value including a representative value of each of color components in a reference region corresponding to a predetermined portion of the bowl 101*a* except for the drain hole. Next, the extraction part 222 extracts a specific area to be described later from the second image. Subsequently, the extraction part 222 extracts, for the extracted specific area, a pixel group including a pixel having a pixel value out of a predetermined range including the toilet representative value. The toilet representative value includes a representative value of each of colors of the toilet 101, that is, includes a representative value of each of the three color components of R, G, and B. The representative value takes, for example, an average value or a center value of pixel values for each of R, G, and B. A coordinate of the reference region on the second image adopts a coordinate preliminarily calculated from an attachment position and a view angle of the camera 51 to the toilet 101. The predetermined range including the toilet representative value means, for example, a range of pixel values each representing a color which is regarded as being substantially the same as a color represented by the toilet representative value. The toilet representative value includes three representative values of R, G, and B. From these perspectives, when at least one of the pixel values of R, G, B of a target pixel is out of a predetermined range including a representative value of a corresponding color, the target pixel is extracted as a pixel included in the pixel group.

The dividing part 223 extracts, from the first image, a specific area being a predetermined region including the drain hole of the toilet 101. A coordinate of the specific area on the first image adopts a coordinate preliminarily calculated from an attachment position and a view angle of the camera 51 to the toilet 101. The dividing part 223 removes the pixel group 231 from the specific area and divide the specific area subjected to the removal of the pixel group 231 into a plurality of divisional areas. Here, the dividing part 223 divides the specific area into sixty-four divisional areas, i.e., 8×8=64. However, this is a mere example, and the dividing part 223 may divide the specific area into an appropriate number of divisional areas, e.g., 2×2=4, 4×4=16, and other number.

The calculation part 224 calculates an area representative value including a representative value of each of the color components of each of the divisional areas. Here, when a divisional area containing a contour of excrement is detected among the divisional areas, the calculation part 224 calculates the area representative value of the detected divisional area by using only pixels constituting the excrement. In this manner, the area representative value is calculatable by using only the information about the excrement. The area representative value includes a representative value of a pixel value of each of R, G, and B forming each of the divisional areas. The representative value takes, for example, an average value or a center value.

The output part 225 outputs the area representative value of each of the divisional areas. Here, the output part 225 generates communication data containing the area representative value, the user ID representing an identifier of the excreter, and a time stamp indicating an excretion date and time, and transmits the communication data to the server 3 by using the communication circuit 21.

The memory 23 includes a rewritable non-volatile storage device, e.g., flash memory. The memory 23 stores the pixel group 231 and a toilet representative value 232. The pixel group 231 is calculated in advance through the calibration described above. The toilet representative value 232 is calculated in advance through the calibration described above.

Figure 4:
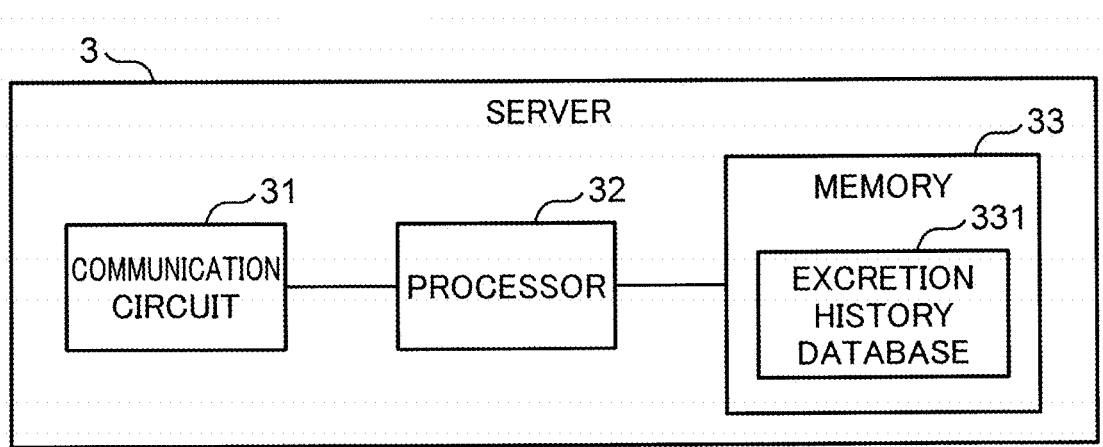
FIG. 4 is a block diagram showing an example of a configuration of a server.

FIG. 4 is a block diagram showing an example of a configuration of the server 3. The server 3 includes a communication circuit 31, a processor 32, and a memory 33. The communication circuit 31 connects the server 3 to the network NT. The processor 32 includes, for example, a CPU, and controls the entirety of the server 3. For instance, the processor 32 acquires communication data transmitted from the output device 2 by using the communication circuit 31, generates excretion history information in association with an area representative value, a user ID, and a time stamp each contained in the communication data, and stores the generated excretion history information in an excretion history database 331.

The memory 33 includes a non-volatile storage device, such as a solid state drive or a hard disk drive, and stores the excretion history database 331. The excretion history database 331 is a database for storing one piece of the excretion history information for one record.

FIG. 5 is a block diagram showing an example of a configuration of the display device 4. The display device 4 includes a communication circuit 41, a processor 42, a memory 43, a display 44, and a manipulation part 46. The communication circuit 41 connects the display device 4 to the network NT. The communication circuit 41 receives the excretion history information from the server 3.

For instance, the processor 42 includes a CPU, and has an acquisition part 421, a generation part 422, and an output part 423. Each of the constituent elements of the acquisition part 421 to the output part 423 is realized when the CPU executes a predetermined program. However, this is a mere example, and each of the acquisition part 421 to the output part 423 may be established in the form of a dedicated hardware circuit.

The acquisition part 421 acquires the excretion history information transmitted from the server 3 by using the communication circuit 41. In this manner, the acquisition part 421 can acquire an area representative value including a representative value of each of the color components of each of a plurality of divisional areas obtained by dividing the first image.

The generation part 422 generates a display image showing each of the divisional areas at the area representative value corresponding to the divisional area. For example, when a certain divisional area is defined as a target divisional area, the generation part 422 sets a pixel value of each of R, G, B of each pixel of the target divisional area to a representative value of each of R, G, B contained in the area representative value corresponding to the target divisional area. The generation part 422 generates the display image by performing this process onto all the divisional areas. Consequently, a display image G3 as shown in FIG. 11 is obtained.

The output part 423 outputs the display image generated by the generation part 422 to the display 44.

The memory 43 includes a rewritable non-volatile storage device, e.g., flash memory.

The display 44 includes, for example, a display device, such as a liquid crystal display panel and an organic EL panel.

The manipulation part 46 includes a keyboard, a mouse, and a touch screen for receiving an instruction from a user.

Heretofore, the configuration of the excrement management system 1 is described. Next, a process by the excrement management system 1 will be described. FIG. 6 is a flowchart showing an example of a process by the output device 2 according to the first embodiment of the disclosure.

In step S1, the acquisition part 221 determines, based on sitting data, whether a user sits on the toilet 101. For instance, the sitting data contains "ON" data indicating the sitting when the user sits on the toilet. Further, the sitting data contains "OFF" data indicating non-sitting when the user does not sit on the toilet. Hence, the acquisition part 221 may determine that the user sits on the toilet when the sitting data contains the "ON" data, and determine that the user does not sit on the toilet when the sitting data contains the "OFF" data.

When it is determined that the user sits on the toilet 101 (YES in step S1), the acquisition part 221 acquires an image from the camera 51. Contrarily, when it is determined that the user does not sit on the toilet 101 (NO in step S1), the process waits in step S1.

In step S3, the dividing part 223 detects whether excrement exists in the bowl 101*a*. Specifically, the dividing part 223 extracts a specific area from the image, and removes the pixel group 231 from the extracted specific area. Subsequently, in a case where the specific area subjected to the removal of the pixel group 231 includes a predetermined number of or more pixels each having a pixel value out of a predetermined range including the toilet representative value 232, the dividing part 223 may define a pixel group constituted by the pixels as an image constituting the excrement and determine that the bowl 101*a* has the excrement. In contrast, in another case where the specific area subjected to the removal of the pixel group 231 includes no pixel having a pixel value out of the predetermined range including the toilet representative value 232, or includes pixels each having a pixel value out of the predetermined range including the toilet representative value 232 but the number of pixels is smaller than the predetermined number of pixels, the dividing part 223 may determine that the bowl 101*a* has no excrement. Hereinafter, the image detected as covering the excrement is referred to as the first image as described above. The excrement detected here includes stool and urine.

When the excrement is detected (YES in step S3), the process proceeds to step S4. When the excrement is not detected (NO in step S3), the process returns to step S2 to acquire a subsequent image.

In step S4, the dividing part 223 extracts a specific area from the first image. As shown in FIG. 10, a specific area 80 represents a quadrangular area including a whole or part of a drain hole 104 on the first image.

In step S5, the dividing part 223 removes the pixel group 231 from the specific area 80. The pixel group 231 includes pixels constituting the drain hole 104 and pixels constituting a stain adhered to the toilet 101 in the specific area 80 as shown in FIG. 10.

In step S6, the dividing part 223 divides the specific area 80 subjected to the removal of the pixel group 231 into the sixty-four divisional areas, i.e., 8×8=64. FIG. 9 shows an example of the specific area 80 divided into divisional areas 8. The specific area 80 is divided into the sixty-four divisional areas 8 by multiplying eight in a vertical direction by eight in a horizontal direction, i.e., 8×8=64.

Here, each of the divisional areas 8 is given corresponding one of indexes 1 to 64. In this example, each of the divisional areas 8 is given a corresponding reference numeral, that is, the divisional area 8 denoted with index 1 is given a reference numeral "8(1)", the divisional area 8 denoted with index 8 is given a reference numeral "8(8)" and the like. For convenience of explanation, FIG. 9 shows an image not covering excrement. Actually, an image covering excrement, i.e., the specific area 80 of the first image, is divided into the divisional areas 8.

Referring back to FIG. 6, the calculation part 224 calculates, in step S7, an area representative value of each of the divisional areas 8. Here, there are sixty-four divisional areas 8, and thus, sixty-four area representative values are calculated. Meanwhile, when a divisional area containing a contour of the excrement is detected, the calculation part 224 may calculate an area representative value of the detected divisional area by using only pixels constituting the excrement. For example, the calculation part 224 may detect the contour from the image of the excrement extracted in step S3, and detect a divisional area 8 containing the detected contour as the divisional area 8 containing the contour of the excrement.

In step S8, the acquisition part 221 detects, from the sitting data, whether the user leaves the toilet 101 and thus the toilet seat is unoccupied. When non-sitting is detected (YES in step S8), the process proceeds to step S9. Contrarily, when non-sitting is not detected (NO in step S8), i.e., when the user continues sitting on the toilet 101, the process returns to step S2. Thereafter, steps S2 to S7 are executed onto a subsequent image.

In step S9, the output part 225 transmits communication data containing an area representative value to the server 3 by using the communication circuit 21. Specifically, the output part 225 transmits, to the server 3, the communication data containing a user ID of a user having excreted, a time stamp, and the area representative value. Each area representative value is associated with an index indicating a position of a corresponding divisional area.

In this flowchart, the area representative value is calculated for each image captured by the camera 51 at a predetermined frame rate. Therefore, when steps S2 to S7 are applied to a plurality of images, area representative values contained in communication data include an area representative value for each of the images. For instance, when steps S2 to S7 are applied to n-images, n-sets of area representative values are contained. Here, one set of area representative values includes sixty-four area representative values.

In this manner, in the process shown in FIG. 6, the communication data contains the n-sets of area representative values in place of the first image. Here, the one set of area representative values includes the sixty-four area representative values, and each of the representative values includes a representative value of each of R, G, and B. For example, when a representative value of a specific color component is represented by eight bits, a data amount of the one set of area representative values indicates 24×64 bits at most. From this perspective, the configuration where the communication data contains the n-sets of area representative values attains a much smaller data amount of the communication data and a greater reduction in a communication load than a configuration where the communication data contains the first image or the specific area 80. Moreover, the server 3 can avoid storing the image data or the specific area 80 in the excretion history database 331. Therefore, a consumptive amount of a memory source of the server 3 is greatly suppressed.

Besides, the area representative value contained in the communication data may be an average value of the n-sets of area representative values. Accordingly, the data amount of the communication data is further suppressible.

FIG. 7 shows an example of a process by the display device 4 for displaying a display image. In step S20, the acquisition part 421 transmits an acquisition request for the excretion history information to the server 3 by using the communication circuit 41. Here, the manager may activate a predetermined application to cause the display 44 to display a predetermined input screen image, and manipulate the manipulation part 46 to input a necessary matter on the input screen image. The acquisition part 421 may generate an acquisition request containing the input necessary matter and transmit the generated acquisition request to the server 3. Examples of the necessary matter include a user ID and a period for the excretion history information to be acquired. The server 3 having received the acquisition request acquires, from the excretion history database 331, the excretion history information corresponding to the user ID and the period contained in the acquisition request, and transmits the acquired excretion history information to the display device 4.

In step S21, the acquisition part 421 acquires the excretion history information by using the communication circuit 41. In this manner, the acquisition part 421 can acquire an area representative value in the relevant period for a user having the user ID. Here, it is presumed that n-sets of area representative values are acquired. Hereinafter, one set of area representative values to be processed among the n-sets of area representative values is explained as a target set of area representative values.

In step S22, the generation part 422 generates, for an area representative value in the target set, a display image showing each of the divisional areas at a representative value corresponding to each divisional area 8. Here, there are sixty-four divisional areas 8, and therefore, a pixel value of each of all the pixels of each of the sixty-four divisional areas 8 is set at an area representative value corresponding to each divisional area 8. A display image constituted by sixty-four panel sections, i.e., 8×8=64, is thus generated. The generation part 422 executes the process for each of the area representative values in the n-sets, and generates n-display images.

In step S23, the output part 423 displays the display image on the display 44. The output part 423 may display a certain representative display image among n-display images on the display. The certain representative display image may be, for example, an image at an early excretion time, an intermediate excretion time, or a late excretion time among the n-display images, or an image covering the largest size of excrement. Alternatively, the output part 423 may change a display image to be displayed on the display 44 among the n-display images in response to a manipulation input by the manager to the manipulation part 46. Further alternatively, the output part 423 may chronologically display the n-display images on the display 44 by sequentially changing the images at a predetermined frame rate.

FIG. 11 shows an example of the display image G3. FIG. 12 shows an example of an image G1 of the specific area 80 extracted from the first image. The display image G3 shown in FIG. 11 is generated from the image G1 shown in FIG. 12. The display image G3 includes sixty-four panel sections 1101, i.e., 8×8=64. Each of the panel sections 1101 corresponds to each of the divisional areas 8.

The image G1 shows excrement as it is. Hence, displaying of the image G1 as it is on the display 44 leads to a failure in protection of the privacy of the user and to an increase in a phycological stress of the manager.

Instead, the display image G3 is displayed on the display 44 in the embodiment. The display image G3 includes the sixty-four panel sections 1101, and each of the panel sections 1101 shows an image having a single color constituted by a color represented by an area representative value of the divisional area 8 corresponding to the panel section 1101. Therefore, displaying of the display image G3 can more effectively protect the privacy of the user and suppress the phycological stress of the manager than the displaying of the image G1 showing the excrement as it is. Moreover, the display image G3 shows information about the excrement per panel section 1101, and accordingly allows the manager to roughly grasp the color, the shape, and the size of the excrement therefrom. Consequently, the manager can accurately grasp the state of the excrement of the user and understand the health condition of the user.

FIG. 8 is a flowchart showing an example of a calibration process in the output device 2. The calibration process is executed at a time when the output device 2 and the sensor unit 5 are arranged at the toilet 101. Alternatively, the calibration process may be executed at a fixed interval after the arrangement of the device and the unit in addition to the time of the arrangement. The calibration process is periodically and appropriately executed, for example, daily, weekly, monthly or the like. Here, the calibration process is defined to be daily executed.

In step S41, the acquisition part 221 acquires a second image not covering excrement from the camera 51.

In step S42, the extraction part 222 calculates a toilet representative value. Calculation of the toilet representative value will be described in detail below. FIG. 10 is an explanatory view of the calibration process. First, the extraction part 222 extracts, from a second image G2, a reference region 90 located on a predetermined coordinate of the second image G2. Next, the extraction part 222 calculates a representative value of each of R, G, and B by calculating an average value or a center value of pixel values of respective pixels constituting the reference region 90 for each of R, G, B. In this manner, the toilet representative value including the representative value of each of R, G, B is calculated. The reference region 90 is set to a region where a feature of a color of the toilet 101 is most notably seen on the second image G2. Therefore, the toilet representative value can indicate a representative color in the toilet 101. In the example in FIG. 10, as shown in table H1, the toilet representative value is calculated, based on the representative value "36" of "R", the representative value "49" of "G", and the representative value "42" of "B". Here, the representative value indicates data having eight bits, specifically, having a value of 0 to 255.

Referring back to FIG. 8, in step S43, the extraction part 222 extracts a specific area 80 from the second image. The specific area 80 extracted here has the same coordinate as the coordinate of the specific area 80 extracted from the first image.

In step S44, the extraction part 222 extracts, in the extracted specific area 80, a pixel group including pixels each having a pixel value out of a predetermined range including the toilet representative value. Hence, as shown in FIG. 10, pixels constituting the drain hole 104 and pixels constituting a statin adhered to the toilet 101 in the specific area 80 are extracted as a pixel group 231.

In step S45, the extraction part 222 stores the pixel group 231 in the memory 23.

Thereafter, after the pixel group 231 constituting the drain hole 104 and the stain adhered to the toilet 101 is removed from the specific area 80 extracted from the first image, an area representative value is calculated. Consequently, an area representative value more accurately indicating the state of the excrement is calculatable.

Second Embodiment

A second embodiment is aimed at changing, based on a state of excrement, a dividing number into divisional areas 8. FIG. 13 is a block diagram showing an example of a configuration of an output device 2A according to the second embodiment of the disclosure. In the embodiment, constituent elements which are the same as those in the first embodiment are given the same reference numerals and signs, and thus explanation therefor will be omitted.

A processor 22A has an acquisition part 221, an extraction part 222, a dividing part 223A, a calculation part 224, an output part 225, and a state detection part 226. The dividing part 223A determines, based on a state of excrement detected by the state detection part 226, the dividing number into the divisional areas 8. For instance, the dividing part 223A increases the dividing number when the state detected by the state detection part 226 is at least one of a state where the excrement contains blood and a state where the excrement contains undigested stool.

The state detection part 226 detects the state of the excrement from a first image. For example, the state detection part 226 may detect, based on a color of an image of excrement extracted from the first image by the dividing part 223A, the state of the excrement. The detected state of the excrement includes at least one of the state of containing blood and the state of containing the undigested stool.

FIG. 14 is a flowchart showing an example of a process by the output device 2A in the second embodiment of the disclosure. In FIG. 14, steps which are the same as those in FIG. 6 are given the same reference numerals and signs, and the explanation therefor will be omitted.

In step S3, when the dividing part 223A detects existence of excrement in the bowl 101a (YES in step S3), the state detection part 226 detects a state of the excrement. It is noted here that first to fourth states described below are detected. The first state is a state of containing both blood and undigested stool. The second state is a state of containing only the undigested stool. The third state is a state of containing only the blood. The fourth state is a state of containing no blood and no undigested stool. It is seen from these perspectives about the states of excrement that the first state is the worst, the second state is the second worst, and the third state is the third worst, and the fourth state has no problem.

In step S102, the dividing part 223A determines, based on the detected state of the excrement, the dividing number. For example, the dividing part 223A may determine the dividing number as a first dividing number for each of the first state, the second state, and the third state, and may determine the dividing number as a second dividing number for the fourth state. In this respect, "the first dividing number>the second dividing number" is defined. The second dividing number represents a dividing number based on 8×8=64 serving as a default. The first dividing number represents, for example, the dividing number of 9×9=81. The dividing part 223A may increase the dividing number into the divisional areas 8 as the state of the excrement gets worse.

Hereinafter, step S4 and the subsequent steps are executed in the same manner as those in FIG. 6.

FIG. 15 is a flowchart showing details of the content of step S101 in FIG. 14. In step S201, the state detection part 226 acquires, from the dividing part 223A, an image of the excrement extracted by the dividing part 223A.

In step S202, the state detection part 226 determines, based on the image of the excrement, whether the excrement contains blood. The state detection part 226 determines that the excrement contains blood when, for example, a predetermined number of or more pixels each having a pixel value falling within a predetermined range including a predetermined RGB value indicating the blood on the image of the excrement. In contrast, the state detection part 226 determines that the excrement contains no blood when the number of pixels each having a pixel value falling within the predetermined range including the predetermined RGB value indicating blood is smaller than the predetermined number on the image of the excrement.

When it is determined that the blood is contained (YES in step S202), the process proceeds to step S203. When it is determined that no blood is contained (NO in step S202), the process proceeds to step S205.

In step S203, the state detection part 226 determines, based on the image of the excrement, whether the excrement contains undigested stool. Here, the state detection part 226 may determine that the excrement contains the undigested stool when the image of the excrement contains a predetermined number of or more pixels each having a pixel value falling within a predetermined range including a predetermined RGB value indicating the undigested stool on the image of the excrement. In contrast, the state detection part 226 may determine that the excrement contains no undigested stool when the number of pixels each having a pixel value falling within the predetermined range including the predetermined RGB indicating the undigested stool is smaller than the predetermined number on the image of the excrement.

When it is determined that the undigested stool is contained (YES in step S203) the process proceeds to step S204. When it is determined that no undigested stool is contained (NO in step S203), the process proceeds to step S207.

In step S204, the state detection part 226 determines the state of the excrement containing the blood and the undigested stool as the first state.

In step S207, the state detection part 226 determines the state of the excrement containing only the blood without the undigested stool as the third state.

In step S205, the state detection part 226 determines whether undigested stool is contained. Details of the step are the same as those of step S203. When it is determined that the undigested stool is contained (YES in step S205), the process proceeds to step S206. When it is determined that no undigested stool is contained (NO in step S205), the process proceeds to step S208.

In step S206, the state detection part 226 determines the state of the excrement containing only the undigested stool without any blood as the second state.

In step S208, the state detection part 226 determines the state of the excrement containing neither blood nor undigested stool as the fourth state. The process having undergone steps S204, S206, S207, S208 proceeds to step S102 in FIG. 14.

Conclusively, in the second embodiment, the dividing number is increased in a case where excrement is in at least one of a state of containing blood or a state of containing undigested stool. In such a case, a manager can observe the excrement in more detail and thus can detect a possible disease of the excreter at an early stage.

INDUSTRIAL APPLICABILITY

This disclosure is useful for management of a health condition based on excrement of a user in, for example, an elderly care facility and a hospital.

The invention claimed is:

1. An output device for outputting information about excrement, comprising:
  a processor; and
  a memory, wherein
  the processor is configured to:
    acquire a first image covering the excrement captured by a camera to photograph an inside of a bowl of a toilet, the first image containing one or more color components;
    detect whether the first image contains an image of the excrement;

divide the acquired first image into a plurality of
divisional areas;
calculate an area representative value including a rep-
resentative value of each of the color components of
each of the divisional areas; and
output the calculated area representative value, wherein
the dividing operation divides the first image by a prede-
termined number of pixels in a vertical direction and a
horizontal direction, into the divisional areas contain-
ing pixels of the excrement when the detecting opera-
tion detects that the first image contains the image of
the excrement,
a pixel value of each of all pixels included in each of the
divisional areas is set to the area representative value
corresponding to each of the divisional areas, and
the calculating operation calculates an area representative
value of the divided divisional areas using only pixels
of the excrement for the divided divisional area con-
taining a contour of the image of the excrement, and
the processor is further configured to:
acquire a second image not covering the excrement
captured by the camera;
extract, from the acquired second image, a pixel group
including pixels constituting a drain hole of the
toilet, the pixel group being calculated in advance
through calibration; and
remove the pixel group from the first image, and divide
the first image subjected to the removal into a
plurality of divisional areas.
2. The output device according to claim 1, wherein the
processor is further configured to
calculate, for the second image, a toilet representative
value including a representative value of each of the
color components in a region corresponding to a pre-
determined portion of the bowl except for the drain
hole, and
extract, as a pixel in the image pixel group, a pixel having
a pixel value out of a predetermined range including the
toilet representative value.
3. The output device according to claim 1, wherein the
processor is further configured to extract the pixel group at
a time when the output device is arranged or at a fixed
interval.
4. The output device according to claim 1, wherein the
processor is further configured to
detect a state of the excrement from the first image, and
determine, based on the detected state, a dividing number
by which the first image is divided into the divisional
areas.
5. The output device according to claim 4, wherein the
processor is further configured to increase the dividing
number when the excrement is at least in a state of contain-
ing blood or a state of containing undigested stool.
6. The output device according to claim 1, wherein the
processor is further configured to divide a predetermined
specific area of the first image including the drain hole of the
toilet into a plurality of divisional areas.
7. The output device according to claim 1, wherein the
processor is further configured to output the area represen-
tative value to the server connected via a network.
8. The output device according to claim 1, wherein the
one or more color components include red, green, and blue
components.
9. The output device according to claim 1, wherein the
area representative value takes an average value of pixel
values for each of the color components of each of the
divisional areas.

18

10. The output device according to claim 1, wherein the
calibration is executed at time of arrangement of the output
device or periodically after the arrangement of the output
device.
11. An output device for outputting information about
excrement, comprising:
a processor; and
a memory, wherein
the processor is configured to:
acquire a first image covering the excrement captured
by a camera to photograph an inside of a bowl of a
toilet, the first image containing one or more color
components,
detect whether the first image contains an image of the
excrement,
divide the acquired first image into a plurality of
divisional areas,
calculate an area representative value including a rep-
resentative value of each of the color components of
each of the divisional areas, and
output the calculated area representative value, wherein
the dividing operation divides the first image by a prede-
termined number of pixels in a vertical direction and a
horizontal direction, into the divisional areas contain-
ing pixels of the excrement when the detecting opera-
tion detects that the first image contains the image of
the excrement,
a pixel value of each of all pixels included in each of the
divisional areas is set to the area representative value
corresponding to each of the divisional areas, and
the calculating operation calculates an area representative
value of the divided divisional areas using only pixels
of the excrement for the divided divisional area con-
taining a contour of the image of the excrement, and
the processor is further configured to:
acquire a second image not covering the excrement
captured by the camera;
extract, from the acquired second image, a pixel group
including pixels constituting a stain adhered to the
toilet, the pixel group being calculated in advance
through calibration,
store the pixel group in the memory; and
remove the pixel group from the first image, and divide
the first image subjected to the removal into a
plurality of divisional areas.
12. A method for an output device that outputs informa-
tion about excrement, by a processor included in the output
device, comprising:
acquiring a first image covering the excrement captured
by a camera to photograph an inside of a bowl of a
toilet, the first image containing one or more color
components;
detecting whether the first image contains an image of the
excrement;
dividing the acquired first image into a plurality of
divisional areas;
calculating an area representative value including a rep-
resentative value of each of the color components of
each of the divisional areas; and
outputting the calculated area representative value,
wherein
the dividing operation divides the first image by a prede-
termined number of pixels in a vertical direction and a
horizontal direction, into the divisional areas contain-
ing pixels of the excrement when the detecting opera-
tion detects that the first image contains the image of
the excrement, a pixel value of each of all pixels included in each of the divisional areas is set to the area representative value corresponding to each of the divisional areas, and the calculating operation calculates an area representative value of the divided divisional areas using only pixels of the excrement for the divided divisional area containing a contour of the image of the excrement, wherein the method further comprises performing with the processor:

acquiring a second image not covering the excrement captured by the camera;

extracting, from the acquired second image, a pixel group including pixels constituting a drain hole of the toilet;

storing the pixel group in a memory, the pixel group being calculated in advance through calibration; and removing the pixel group from the first image, and dividing the first image subjected to the removal into a plurality of divisional areas.

13. A non-transitory computer-readable recording medium storing a program for causing a computer to serve as an output device that outputs information about excrement, comprising:

causing a processor included in the output device to execute:

acquiring a first image covering the excrement captured by a camera to photograph an inside of a bowl of a toilet, the first image containing one or more color components;

detecting whether the first image contains an image of the excrement;

dividing the acquired first image into a plurality of divisional areas;

calculating an area representative value including a representative value of each of the color components of each of the divisional areas; and outputting the calculated area representative value, wherein the dividing operation divides the first image by a predetermined number of pixels in a vertical direction and a horizontal direction, into the divisional areas containing pixels of the excrement when the detecting operation detects that the first image contains the image of the excrement, a pixel value of each of all pixels included in each of the divisional areas is set to the area representative value corresponding to each of the divisional areas, and the calculating operation calculates an area representative value of the divided divisional areas using only pixels of the excrement for the divided divisional area containing a contour of the image of the excrement, the program further causing the processor to further execute:

acquiring second image not covering the excrement captured by the camera;

extracting, from the acquired second image, a pixel group including pixels constituting a drain hole of the toilet;

storing the pixel group in a memory, the pixel group being calculated in advance through calibration; and removing the pixel group from the first image, and dividing the first image subjected to the removal into a plurality of divisional areas.

\* \* \* \* \*